United States Patent [19]

Rohring et al.

[11] Patent Number: 5,711,602
[45] Date of Patent: Jan. 27, 1998

[54] MOTORIZED STIRRING MECHANISM FOR A POT

[76] Inventors: Wesley Rohring, 4158 E. Lake Rd., Wilson, N.Y. 14172; John A. Cecala, 6 Tanglewood Dr., East, Orchard Park, N.Y. 14127

[21] Appl. No.: 818,323

[22] Filed: Mar. 14, 1997

[51] Int. Cl.[6] ............................. B01F 7/20; A47J 43/044
[52] U.S. Cl. ............................................. 366/251; 99/348
[58] Field of Search ......................... 366/64–66, 96–98, 366/242–251, 281–286, 347; 99/348

[56] References Cited

U.S. PATENT DOCUMENTS

| | | |
|---|---|---|
| 1,193,954 | 8/1916 | Walden . |
| 1,891,122 | 12/1932 | Urch . |
| 4,151,792 | 5/1979 | Nearhood ............................. 366/251 X |
| 4,155,656 | 5/1979 | Detmer .................................. 366/282 |
| 4,921,356 | 5/1990 | Bordenga ............................. 366/343 |
| 4,959,517 | 9/1990 | Jump et al. ........................ 366/244 X |
| 5,013,158 | 5/1991 | Tarlow ................................. 366/251 |
| 5,193,441 | 3/1993 | Hayashi ................................. 99/348 |
| 5,201,263 | 4/1993 | Teng . |
| 5,261,745 | 11/1993 | Watkins .............................. 366/250 |
| 5,372,422 | 12/1994 | Dubroy . |
| 5,497,695 | 3/1996 | Canela ............................... 99/348 X |
| 5,516,208 | 5/1996 | Givant ................................ 366/251 |
| 5,547,279 | 8/1996 | Spitzer Sr. ....................... 99/348 X |

*Primary Examiner*—Charles E. Cooley
*Attorney, Agent, or Firm*—Bilicki & Simpson, P.C.

[57] ABSTRACT

The invention broadly comprises a motorized stirring mechanism for a pot, having a round disc-like pot cover having a flange extending downwardly from an outer edge thereof and also having an aperture in the center of the cover, a combination motor-gearbox operatively arranged to be temporarily secured to the cover, the motor-gearbox having an aperture therein which aligns with the cover aperture when the motor-gearbox is secured to the cover, a shaft operatively arranged to pass through the apertures, the shaft operatively arranged to lockingly engage gears of the motor-gearbox when positioned within the motor-gearbox aperture, and an impeller operatively arranged to slidingly engage the shaft longitudinally and lockingly engage the shaft rotationally such that the impeller rotates in unison with the shaft.

7 Claims, 3 Drawing Sheets

MOTORIZED STIRRING MECHANISM FOR A POT

FIELD OF THE INVENTION

The present invention relates to an apparatus for automatically stirring contents of a pot.

BACKGROUND OF THE INVENTION

In many commercial and domestic cooking operations it is necessary to provide substantially continuous stirring so as to void "hot spots" or burning of the product during the cooking cycle. As a result of distractions that often occur in an active kitchen environment, continuous stirring of a product is extremely difficult to achieve by hand.

Various attempts have been made to provide means for automatically stirring a product in pot. For example, U.S. Pat. No. 4,921,356 (Bordenga) discloses motor for continuous stirring, unitary adjustable shaft, and an adaptability to accommodate a variety of pot sizes. The Bordenga patent, however, requires a clamping means to securely fix the motor to the pot and it does trot have a lid that will enclose the pot to prevent spray or splash from escaping.

U.S. Pat. No. 5,261,745 (Watkins) contains a motorized pot with a lid having an access portion operable to allow ready access to the interior of the container without removing the cover. The apparatus, however, requires an awkward clamping means to secure the lid and access portion thereof to the pot. Moreover, the lid and shaft are not capable of accommodating various size pots.

Another effort to provide an adequate automatic stirring apparatus is found in U.S. Pat. No. 1,891,122 (Urch), which discloses rods that secure the motor to the lid and also extend down into the pot to secure the shaft. This securing requires numerous nuts. The Urch Patent, however, fails to provide an adjustable shaft, a simple means of attaching a motor to a lid, a lid which will accommodate wide range of pot sizes, or an easily removable shaft for cleaning.

There exists, therefore, a need for an automatic stirring apparatus that by virtue of the shape and weight of the lid/motor assembly, will fit wide range of pot sizes and will not require a clamping means to secure the lid to the pot or motor to the lid. Moreover, there is need for such an apparatus that combines the stated beneficial elements with a lid having a hinge portion to facilitate an access panel for addition of ingredients, and an extendible and removable shaft/impeller assembly.

SUMMARY OF THE INVENTION

The invention broadly comprises a motorized stirring mechanism for a pot, having a round disc-like pot cover having a flange extending downwardly from an outer edge thereof and also having an aperture in the center of the cover, a combination motor-gearbox operatively arranged to be temporarily secured to the cover, the motor-gearbox having an aperture therein which aligns with the cover aperture when the motor-gearbox is secured to the cover, a shaft operatively arranged to pass through the apertures, the shaft operatively arranged to lockingly engage gears of the motor-gearbox when positioned within the motor-gearbox aperture, and an impeller operatively arranged to slidingly engage the shaft longitudinally and lockingly engage the shaft rotationally such that the impeller rotates in unison with the shaft.

A primary object of the present invention is to provide a motorized stirring mechanism for a pot.

Another object of the present invention to provide a motorized stirring mechanism for a pot designed to fit a wide range of pot sizes.

A further object of the present invention to provide a motorized stirring mechanism for a pot that does not require a clamping means to be secured to a pot.

Still another object of the present invention to provide a motorized mechanism for a pot having a removable shaft/impeller assembly for purposes of easy cleaning.

Yet another object of the present invention to provide a motorized stirring mechanism for a pot having an extendible shaft assembly to facilitate use with pots of varying depth.

Still a further object of the present invention to provide a motorized stirring mechanism for a pot having an access door for addition of ingredients without requiring removal of the lid.

These and other objects, features and advantages of the invention will become readily apparent to one having ordinary skill in the art in view of the following written specification, drawings, and appended claims.

DESCRIPTION OF THE PREFERRED EMBODIMENT

Figure 1:
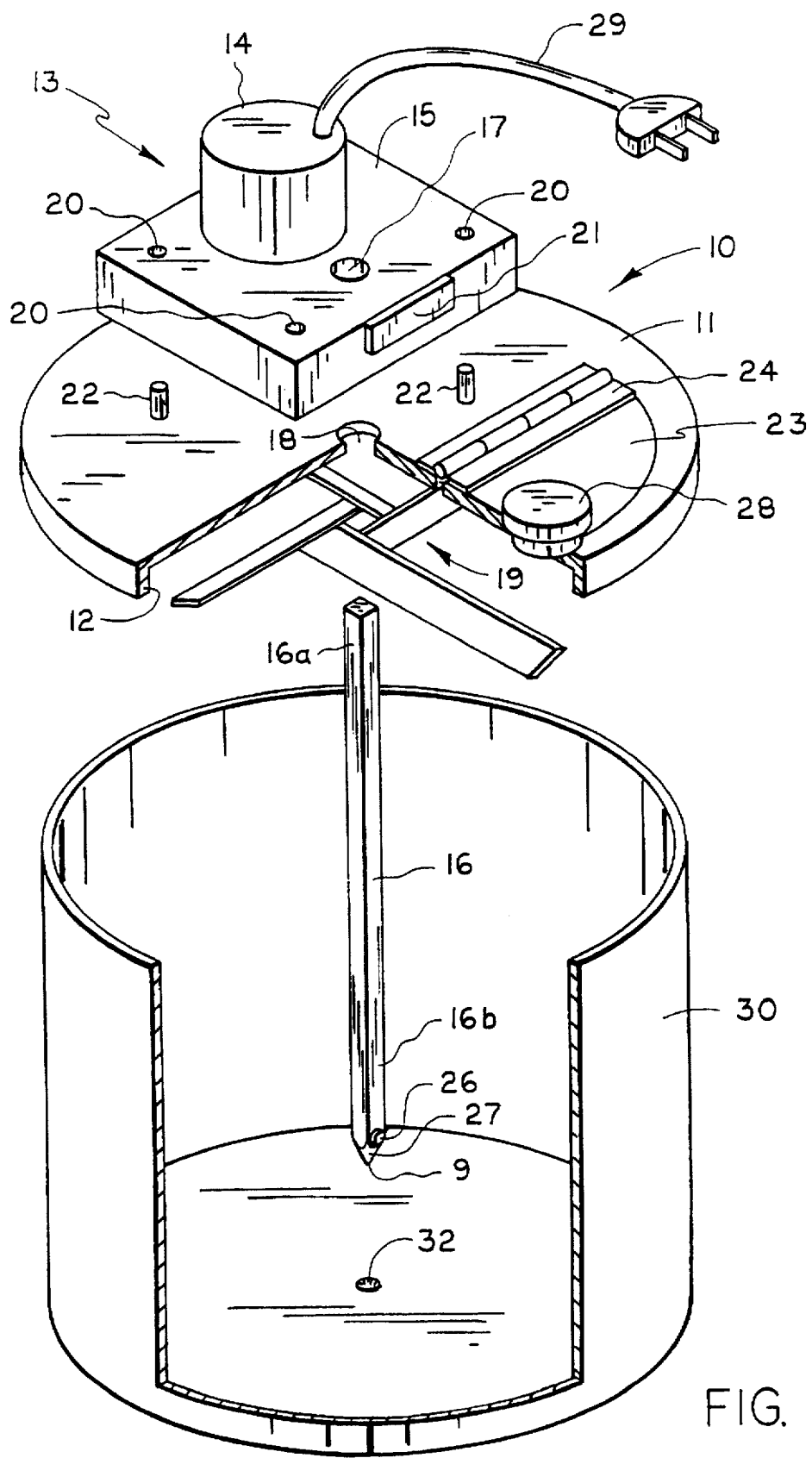
FIG. 1 is a fragmentary exploded perspective view of the motorized stirring mechanism for a pot in combination with a pot.

At the outset, it should be clearly understood that the drawings are to be read together with the specification, and are to be considered a portion of the entire "written description" of this invention. Also, identical reference numerals on different figures refer to identical elements of the invention.

As shown in FIG. 1, motorized stirring mechanism 10 is comprised generally of a round disk-like pot cover 11, a flange 12 extending downwardly from an outer edge of pot cover 11, a combination motor-gearbox 13 having a standard motor 14 and gearbox 15 operatively arranged to drive shaft 16 and impeller 19.

Motor-gearbox 13 contains a plurality of pin holes 20, shaft aperture 17, and magnet 21. Power is supplied to motor 14 via power cord 29.

Extending upwardly from pot cover 11 are pins 22, arranged to align with pin holes 20 to secure motor-gearbox 13 to pot cover 11. Pot cover 11 further comprises access door 23 affixed to pot cover 11 by hinge 24. Access door 23 is preferably comprised of a magnetic material. The access door contains a knob 28 for easy opening of the door. Due to the structure and weight of motorized stirring mechanism 10, clamping of the pot cover to the pot is not necessary. In particular, the combination of the flange on the cover, the weight of the cover/motor/gearbox combination, and the shaft/impeller configuration retains the cover in position on top of the pot.

Motor-gearbox 13 is easily removable from pot cover 11. Motor-gearbox 13, when affixed to pot cover 11, is positioned such that magnet 21 faces access door 23. In operation, when access door 23 is open, it is retained in an upright position by magnetic force of attraction to magnet 21.

Pot cover 11 contains aperture 18 in the center thereof. When motor-gearbox 13 is placed atop pot cover 11, apertures 17 and 18 align. Apertures 17 and 18 are sized to permit shaft 16 to pass therethrough. Shaft 16 is easily removable from the stirring assembly since it is not permanently mounted to the gearbox or motor. In a preferred embodiment, shaft 16 is made of square stock and has a top end 16a and a bottom end 16b. Bottom end 16b preferably concludes with a conical shaped portion 27 terminating in a point 9. In operation, point 9 aligns with recess 32 and functions to hold the shaft/impeller in position within the pot. It should be noted that, although square stock is used in the preferred embodiment, other stock geometry and structure could be used.

Figure 3:
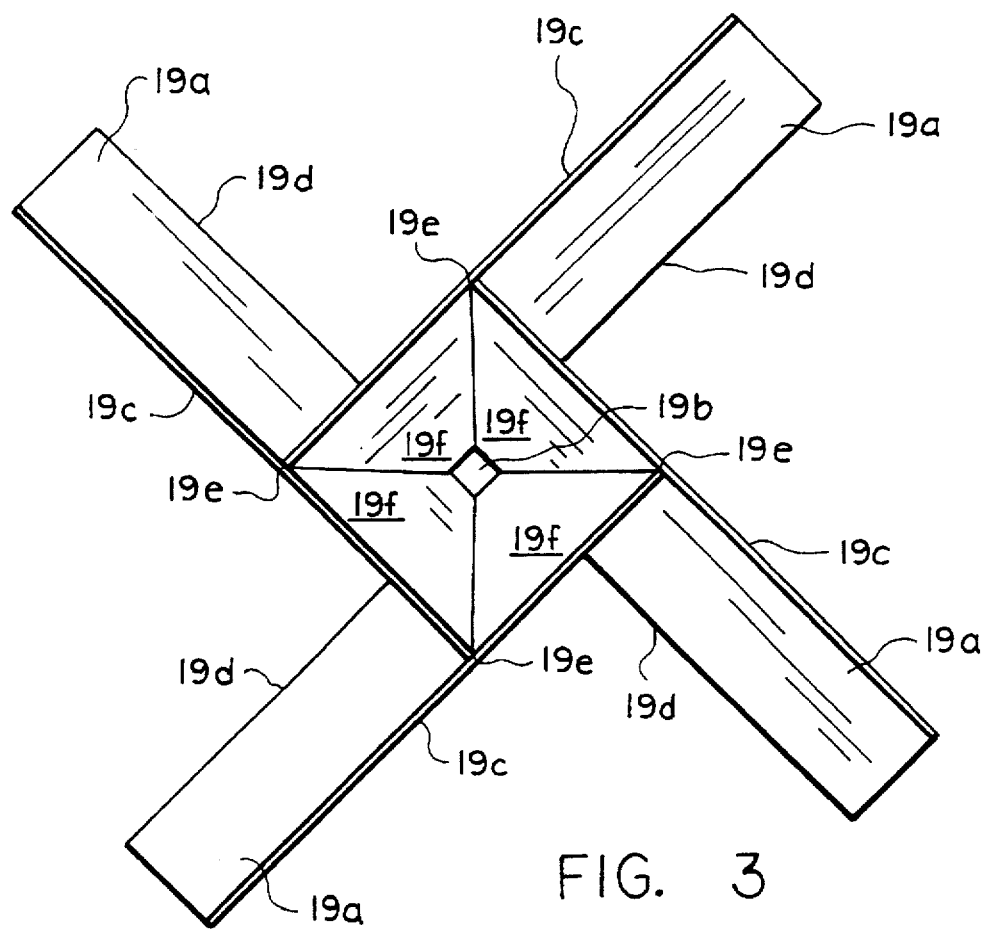
FIG. 3 is a bottom view of the impeller of the motorized stirring mechanism for a pot.

Adverting to FIG. 3, impeller 19 is comprised of a plurality of blades 19a, preferably four which are welded together in a pattern which forms a central aperture 19b. Each blade has a side 19c which is longer than opposite side 19d. Each blade forms a point 19e. When welded together, sections 19f of each blade form a pyrimidal hub structure.

The impeller is installed on the shaft by passing shaft end 16a through aperture 19b. The impeller then slidingly engages the shaft. The impeller slides down the shaft until it comes to rest upon nib 26.

After impeller 19 is mounted on shaft 16, the top section of shaft 16a is passed upwardly through apertures 17 and 18 and into engagement with gear-box 15. Since the shaft may be made of any length (since it extends upwardly through the gearbox), the stirring assembly obviously may be used with pots of any depth.

While motorized stirring mechanism 10 may be used with pots of various sizes, in a preferred embodiment, the invention should be used with a pot 30 having a bottom 31 with a recess 32 in the center thereof. In operation, point 9 aligns with recess 32.

Figure 2A:
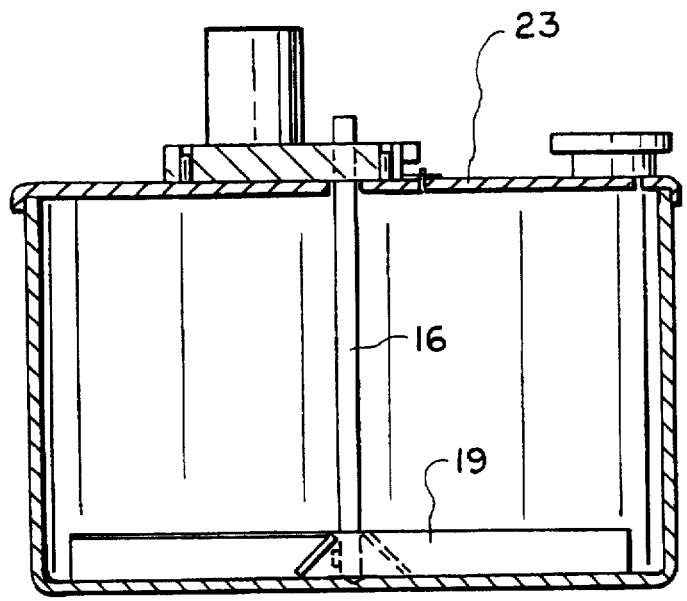
FIG. 2a is a cross-sectional view of the motorized stirring mechanism for a pot in combination with the pot.
Figure 2B:
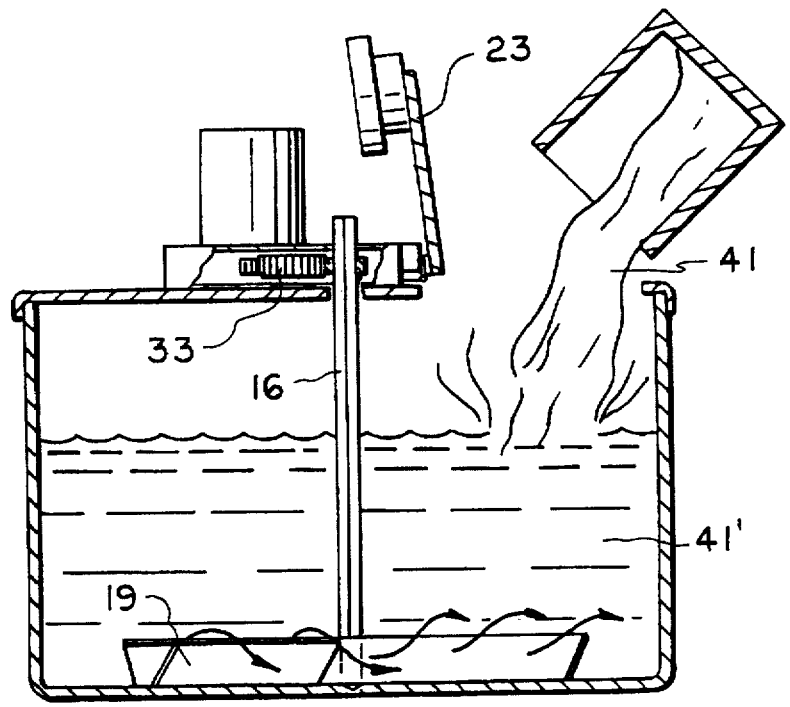
FIG. 2b is a fragmentary cross-sectional view of the motorized stirring mechanism for a pot in combination with a pot.

As shown in FIGS. 2a and 2b, access door 23 may be opened at any time during the cooking operation and held in an upright position by virtue of a magnetic relationship between access door 23 and magnet 21. After access door 23 is opened, ingredients 41 may be added to contents 41' of the pot.

FIG. 2b also illustrates drive gear 33 of gearbox 15 which engages and rotates shaft 16. As a result of the slidingly but tightly fitting relationship between mounting aperture 19b of impeller 19 and shaft 16, the impeller rotates as the shaft rotates. The tilted blades tend to keep ingredients from sticking to the bottom of the pot and direct the ingredients upwardly as indicated by the plurality of arrows at the bottom of the pot in FIG. 2b.

Figure 4:
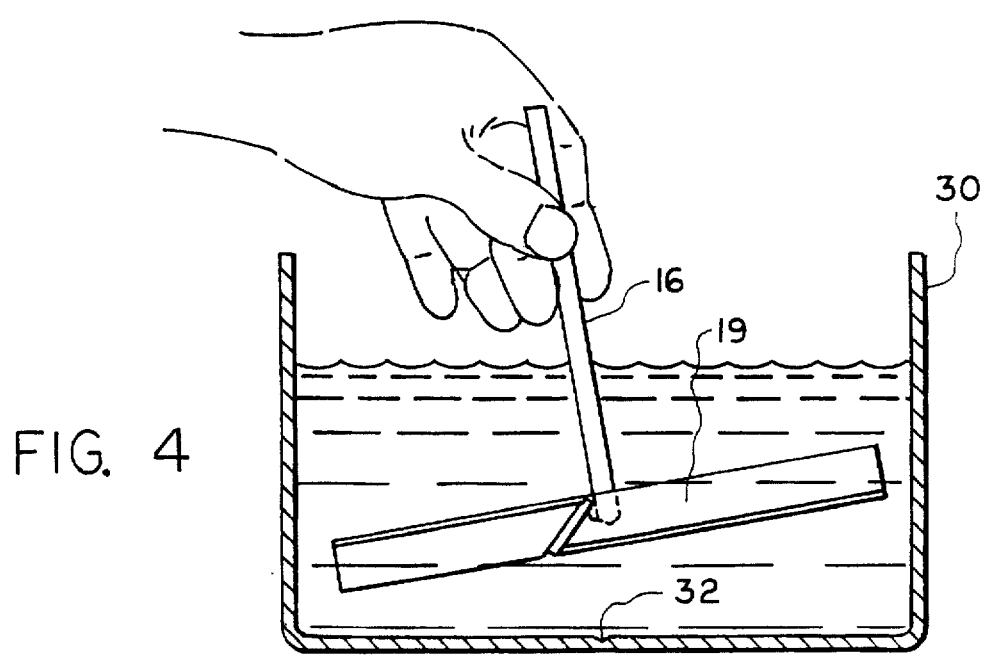
FIG. 4 is a partial cross-sectional view of the shaft and impeller of the motorized stirring mechanism for a pot shown being placed within a pot.

As shown in FIGS. 1 and 4, in operation, shaft 16 and mounted impeller 19 are first placed in a pot. The shaft is then passed through apertures 18 and 17 in cover 11 and gearbox 15, respectively, and 16 engages drive mechanism 33 for rotation.

The present invention has many uses and advantages over known designs. The invention is especially well suited for the preparation of sauces and soups which require long stirring times and have a tendency to burn if not stirred frequently. Another advantage is that all components of the stirring assembly disassemble for easy cleaning. The invention is suitable for use with pots of various diameters and depths.

Although the invention is described by reference to a specific preferred embodiment, it is clear that variations can be made without departing from the spirit of the invention as claimed.

What is claimed is:

1. A motorized stirring mechanism for a pot, comprising:

a round disc-like pot cover having a flange extending downwardly from an outer edge thereof and also having an aperture in the center of said cover;

a combination motor-gearbox operatively arranged to be temporarily secured to said cover, said motor-gearbox having an aperture therein which aligns with said cover aperture when said motor-gearbox is secured to said cover;

a shaft operatively arranged to pass through said apertures, said shaft operatively arranged to lockingly engage gears of said motor-gearbox when positioned within said motor-gearbox aperture; and an impeller operatively arranged to slidingly engage said shaft longitudinally and lockingly engage said shaft rotationally such that said impeller rotates in unison with said shaft.

2. A motorized stirring mechanism for a pot according to claim 1 wherein said combination motor-gearbox additionally comprises two or more pin holes, and said pot cover comprises two or more corresponding pins, where said pins engage said pin holes to secure said motor-gearbox to said cover.

3. A motorized stirring mechanism for a pot according to claim 1 wherein said pot cover additionally comprises a hinged access door.

4. A motorized stirring mechanism for a pot according to claim 3 wherein said access door is comprised of a ferromagnetic material.

5. The motorized stirring mechanism for a pot according to claim 4 wherein said combination motor-gearbox further comprises a magnet positioned to engage said access door when said access door is in an open position.

6. A motorized stirring mechanism for a pot according to claim 1 wherein each blade of said impeller is tilted.

7. A motorized stirring mechanism for a pot according to claim 1 wherein said shaft is operatively arranged to slidingly engage said motor-gearbox for adjustability.

* * * * *